March 15, 1949. M. D. SULLIVAN 2,464,467
SPRING SUSPENSION FOR AUTOMOBILE TRAILERS
Filed May 12, 1947 2 Sheets-Sheet 1

INVENTOR
MATHEW D. SULLIVAN
BY Liverance and
Van Antwerp
ATTORNEYS

March 15, 1949. M. D. SULLIVAN 2,464,467
SPRING SUSPENSION FOR AUTOMOBILE TRAILERS
Filed May 12, 1947 2 Sheets-Sheet 2
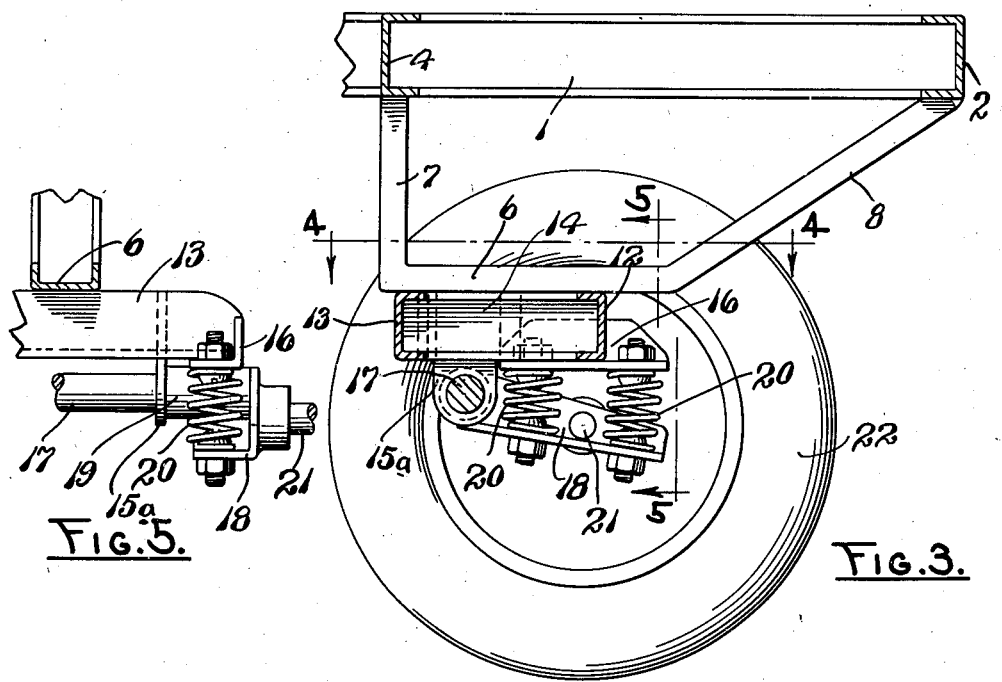
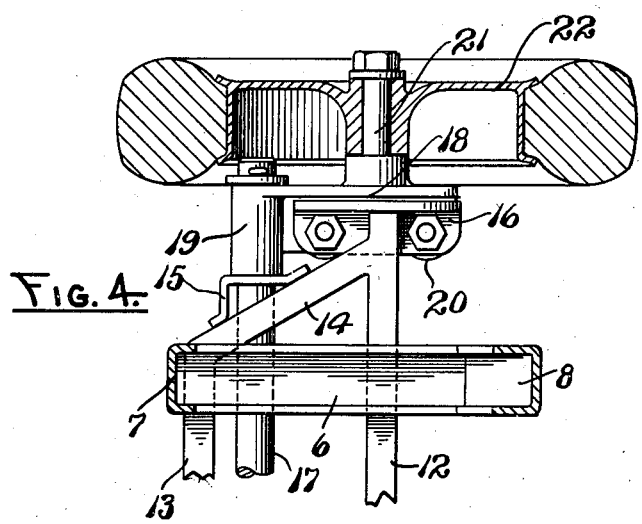
INVENTOR
MATHEW D. SULLIVAN
BY Liverance and
Van Antwerp
ATTORNEYS Patented Mar. 15, 1949

2,464,467

UNITED STATES PATENT OFFICE 2,464,467

SPRING SUSPENSION FOR AUTOMOBILE TRAILERS

Mathew D. Sullivan, Flint, Mich.

Application May 12, 1947, Serial No. 747,410

7 Claims. (Cl. 280—124)

The present invention relates to a trailer chassis frame and wheel suspension, of a very practical and durable form and which may be economically built.

The trailer frame structure is made from commercial forms of iron or steel, produced at rolling mills in standard or stock forms and dimensions. The securing together thereof in the frame structure is by arc electric welding or an equivalent welding, preferably. In the wheel suspension, each wheel is independent of all others in the yielding of its associated springs in their return to normal position. The wheels at opposite sides of the trailer structure are not tied and compelled to move together. This permits a wheel to engage and ride over an obstruction or bump in the road, the springs associated therewith yielding, without affecting other wheels.

It is an object and purpose of the present invention to provide a structure having the desirable features stated, and in which the spring suspension used is very practical, economical and efficient, easily installed and repaired when necessary, and particularly effective for the purposes it is to serve.

Figure 1:
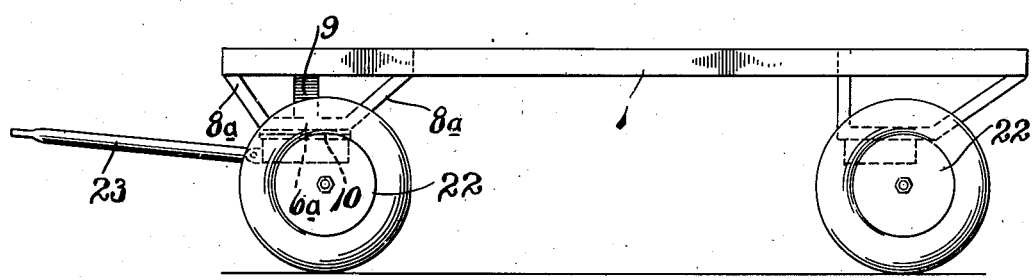
Figure 2:
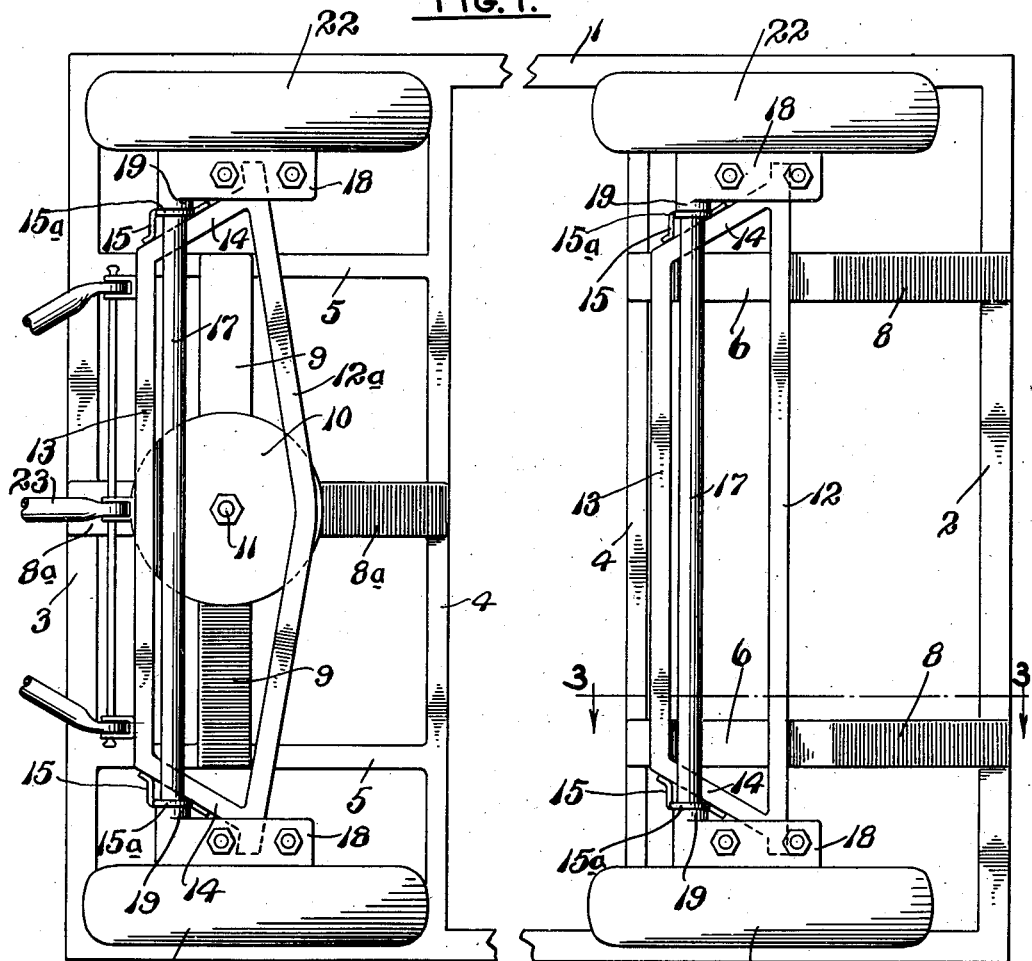

An understanding of the invention may be had from the following description, taken in connection with the accompanying drawings, in which, Fig. 1 is a side elevation of a wheel mounted trailer frame in which my invention is utilized, Fig. 2 is an under plan view of the trailer frame and wheel connection with the intermediate portion of the frame broken away for reasons of space, Fig. 3 is a fragmentary vertical longitudinal section enlarged, at the rear end of the structure, the section being on the plane of line 3—3 of Fig. 2, Fig. 4 is a horizontal section substantially on the plane of line 4—4 of Fig. 3, and Fig. 5 is a fragmentary transverse vertical section and rear elevation substantially on the plane of line 5—5 of Fig. 3.

Like reference characters refer to like parts in the different figures of the drawings, and the sectional views are taken in the directions indicated by the arrows.

The chassis frame structure above which the trailer body (not shown) may be attached and carried includes two spaced parallel sides 1, connected at their rear ends by a transverse frame member 2 and at their front ends by a similar member 3. Paralleling the rear frame member 2 and located a distance in front thereof, and similarly paralleling the front member 3 a distance back thereof, are intermediate cross frame members 4 extending between the side members 1. Between the front member 3 and the cross member 4 back of it, two tie frame members 5, each set inwardly a distance from the adjacent side of the trailer frame, are provided. The various members 1, 2, 3, 4 and 5, in practice are of channel iron form and where they come together are, preferably, securely welded.

At the under side of the rear portion of the frame two supports, likewise of channel iron, paralleling and spaced from each other and set in, one of them a distance from each of the sides of the frame, are used. Each includes an intermediate horizontal section 6 with a vertical arm 7 at its front end, and an upwardly and rearwardly inclined rear section 8. The upper ends of the arms 7 and the sections 8 come to the under flanges of the rear transverse frame member 4 and the rear frame member 2 and are securely welded thereto. At the front, a somewhat similar supporting member is located at the longitudinal center of the frame, having an intermediate horizontal section 6a (Fig. 1) similar to the intermediate section 6, and having at opposite ends upwardly inclined sections 8a, one extending upwardly and forwardly and the other upwardly and rearwardly, welded at their upper ends to the lower flanges of the frame members 3 and 4. Channel members 9 extending between the middle section 6a and the frame bars 5 and welded at their ends thereto, complete a front support for a fifth wheel structure having two circular plates 10, one over the other, the upper one being permanently secured to the under sides of the section 6a and bars 9 of the front support described, and the lower one turning about the axis of a king bolt 11 located at the center of said circular plates 10.

At the under sides of the lower sections 6 of the rear supports, a horizontal frame of channel iron structure is located which extends transversely of the trailer frame. Said under frame has a rear bar 12 and a front bar 13, shorter than the rear bar, paralleling it and in front of it. At each end of the front bar 13 angularly disposed end bars 14 extend outwardly and to the rear, coming to the bar 12 near its ends and being welded thereto. Similarly, at the front is a rear frame bar 12a, differing from the bar 12 in being bent at its middle to have two side sections extending outwardly and forwardly at an angle to each other. The front bar 13 and the end bars 14 are substantially the same as in the first described rear transverse frame. The bars 12 and 13 of the rear frame are in contact engagement with the under sides of the sections 6 and are permanently secured thereto, preferably by welding. The middle portions of the bars 12a and 13 of the front frame are similarly secured at the under side of the under plate 10 of the fifth wheel structure.

At the outer side of each of the diagonal members 14 a metal bracket 15 of the form shown, having a downwardly extending ear 15a, is welded. An angle bracket 16 is welded at the under side of each end of the frame bars 12 and 12a (Fig. 3). A shaft 17 extends through and is mounted on the ears 15a, extending at each end beyond them. On both projecting end portions of each shaft 17 (Fig. 4) an angle arm 18, connected with a sleeve 19, is mounted, the shaft extending through the sleeve and at each end having a washer and cotter pin (Fig. 4) to hold the sleeve from moving outwardly. The sleeve 19 may turn freely on the shaft. The angle arm 18 extends underneath and is spaced from the horizontal under flange of its associated upper bracket 16 (Fig. 3). Coiled compression springs 20, spaced from each other, are located between the horizontal flanges of the angle brackets 16 and arms 18 as shown in Fig. 3. From the vertical flange of each of the angle arms 18 and midway between the two springs 20, a spindle 21 (Figs. 3 and 4) extends outwardly, upon which a wheel 22 is rotatively mounted.

It is apparent that the unit which includes the frames, having the members 12, 13 and 14, or 12a, 13 and 14, with the spring suspension structure described, including the shaft 17, brackets 16, and arms 18 with the springs 20 disposed between them, and the attached spindles and wheels, may be assembled complete. The chassis frame structure, having the various members 1, 2, 3, 4 and 5, and the supporting members with parts 6, 7 and 8, and parts 6a, 8a, 9 and upper disk 10 of the fifth wheel, may be separately assembled and the various parts securely welded together, and a described wheel suspension unit be placed against the sections 6 and welded firmly thereto, at the rear of the trailer frame. The front assembled wheel unit placed against the lower disk or plate 10 of the front fifth wheel is welded thereto and connected by the king bolt 11 at the front of the chassis frame. A tongue structure 23 is pivotally connected to the bar 13 of the front wheel suspension frame, very simply and economically.

Each wheel has an independent spring suspension. The springs 20 farthest away from shafts 17 will be initially compressed more than those nearest to the shafts, providing an easy riding action when the trailer carries a light load, and with increased spring resistance for heavier loads and for shocks. There are no torsional forces acting on the shafts 17.

The structure described is very practical and useful, strong and durable, and the economy of manufacture is evident.

The invention is defined in the appended claims and is to be considered comprehensive of all forms of structure coming within their scope.

I claim:

1. In a structure as described, a chassis frame having parallel side members and front and rear transverse members permanently connected together, a transverse bar between the side members in front of and parallel to the rear frame member permanently secured to the side chassis frame members, downwardly extending supports each having a horizontal intermediate section and upwardly extending end sections, the latter permanently secured to said rear frame member and said transverse bar in front thereof, said supports being spaced from each other, a transverse frame located underneath and permanently connected to said intermediate sections of the supports, a shaft mounted on said transverse frame extending the length thereof, arms rockingly mounted one at each end of the shaft extending rearwardly therefrom, brackets, one over each arm, secured to said frame, spring means between each of said arms and its associated overhead bracket, a spindle connected to and extending outwardly from each of said arms between its ends, and a wheel rotatably mounted on each spindle.

2. A structure as defined in claim 1, said permanent connections of chassis frame members, supports thereto and of transverse frame members to said supports, being welded connections.

3. A construction as defined in claim 1, said spring means each comprising, two spaced generally vertically positioned coiled compression springs, one located nearer the shaft than the other, and the spindle on each arm being located substantially midway between the springs.

4. A chassis frame having parallel spaced side frame members and front and rear cross members permanently connected therewith, a transverse bar between and connected at its ends to the chassis frame members a distance back of and parallel to the front frame member, a support extending between, connected to and extending downwardly from said front member and said transverse frame member back of it, having a horizontal intermediate portion, a fifth wheel structure mounted on said intermediate section of the support having a lower member mounted to turn about a vertical axis, a front transverse frame having front and rear spaced transverse bars and end members connecting them, said front and rear members of the transverse frame having permanent connection to said lower member of the fifth wheel, a shaft carried by said transverse frame at the forward portion thereof and below it, an arm mounted for rocking movement at one end at each end of the shaft, extending rearwardly therefrom, a bracket permanently secured at each end of the transverse frame directly over each arm, a spindle connected to and extending outwardly from each arm, a wheel mounted for rotation on each spindle, and compression spring means between each arm and bracket.

5. A structure as defined in claim 4, each of said spring means comprising a front generally vertically positioned coiled spring and a rear generally vertically positioned coiled spring spaced from the front spring, and said spindle extending from each arm substantially midway between the coiled springs.

6. A structure as defined in claim 4, each of said arms having a horizontal lower flange and a vertical flange at its outer edge, and each of said brackets having a horizontal flange directly over the horizontal flange of its associated arm, the spindles carried by said arms being secured at their inner ends to the vertical flanges thereof.

7. A chassis frame having parallel side channel members and transverse front and rear members having a welded connection thereto, each member having a lower horizontal flange, a transverse member parallel to and spaced a distance forwardly from the rear frame member having a lower horizontal flange and welded at its ends to the sides of the chassis frame, spaced supports of channel form shaped with horizontal intermediate sections and upwardly extending end sections with the webs of said intermediate sections disposed horizontally and the ends of the end sections of the support having welded connection to said rear and transverse chassis frame members, a transverse wheel carrying frame having spaced front and rear channel members and connecting end bars, the upper flanges of said front and rear transverse frame members lying against and having a welded connection to the webs of the intermediate sections of said supports, a shaft mounted upon and located below the ends of the wheel carrying frame, parallel to the front and rear members of said wheel carrying frame, a sleeve journal mounted on each end portion of said shaft, an arm integrally connected with each of said journals extending to the rear, said arm having a lower horizontal flange and a vertical flange extending from the outer edge thereof, a spindle connected at its inner end to the vertical flange of each of said arms extending outwardly therefrom, a wheel rotatably mounted on each spindle, a bracket permanently secured at the under side of said wheel carrying frame adjacent each end thereof having a horizontal flange located over the horizontal flange of each arm and a downwardly extending vertical flange, and generally vertically positioned coiled compression springs between the horizontal flanges of said arms and brackets, one located in front of its associated spindle and the other back thereof.

MATHEW D. SULLIVAN.

REFERENCES CITED

The following references are of record in the file of this patent:

UNITED STATES PATENTS

| Number | Name | Date |
| --- | --- | --- |
| 1,946,948 | Roos | Feb. 13, 1934 |